US011647838B2

(12) United States Patent
Warren (10) Patent No.: US 11,647,838 B2
(45) Date of Patent: May 16, 2023

(54) TILTING MOUNTING APPARATUS

(71) Applicant: Francis Douglas Warren, Bradley Beach, NJ (US)

(72) Inventor: Francis Douglas Warren, Bradley Beach, NJ (US)

(*) Notice: Subject to any disclaimer, the term of this patent is extended or adjusted under 35 U.S.C. 154(b) by 0 days.

(21) Appl. No.: 17/723,647

(22) Filed: Apr. 19, 2022

(65) Prior Publication Data

US 2022/0354253 A1 Nov. 10, 2022

Related U.S. Application Data (60) Provisional application No. 63/184,864, filed on May 6, 2021.

(51) Int. Cl.
| | | |
|---|---|---|
| *F16M 11/04* | (2006.01) | |
| *A47B 97/00* | (2006.01) | |
| *F16M 13/02* | (2006.01) | |
| *F16M 11/20* | (2006.01) | |

(52) U.S. Cl.
CPC ......... *A47B 97/001* (2013.01); *F16M 11/046* (2013.01); *F16M 11/048* (2013.01); *F16M 11/2092* (2013.01); *F16M 13/02* (2013.01); *F16M 2200/041* (2013.01); *F16M 2200/06* (2013.01); *F16M 2200/065* (2013.01)

(58) Field of Classification Search
CPC .. F16M 13/02; F16M 11/2092; F16M 11/046; F16M 11/048; F16M 2200/041; F16M 2200/065; A47B 97/001
USPC .......................... 248/278.1, 280.11, 920, 921
See application file for complete search history.

(56) References Cited

U.S. PATENT DOCUMENTS

| | | | | |
|---|---|---|---|---|
| 7,975,976 | B2* | 7/2011 | Wohlford | F16M 11/2014 52/27 |
| 8,094,438 | B2* | 1/2012 | Dittmer | F16M 13/02 361/679.01 |
| 8,382,052 | B1* | 2/2013 | Mathieson | F16M 11/046 248/240.1 |
| 8,864,092 | B2* | 10/2014 | Newville | F16M 13/02 361/679.01 |
| 9,844,265 | B2* | 12/2017 | Jaramillo | F16M 11/22 |
| 10,281,080 | B1* | 5/2019 | Massey | F16M 13/02 |
| 10,738,941 | B2* | 8/2020 | Newville | F16M 13/02 |
| 11,033,107 | B2* | 6/2021 | Warren | F16M 11/24 |
| 2005/0274855 | A1* | 12/2005 | Shin | F16M 11/048 248/220.22 |
| 2007/0058092 | A1* | 3/2007 | Ryu | H04N 5/64 348/836 |

(Continued)

*Primary Examiner* — Bradley Duckworth
(74) *Attorney, Agent, or Firm* — Dale J. Ream (57) ABSTRACT

A mounting apparatus for positioning a television relative to a wall and a fireplace mantel includes a mounting plate coupled to a distal end of a positioning arm and is moved and positioned according to movement of the positioning arm. The positioning arm has a linear configuration with a proximal end mounted inside an inset wall housing which is itself mounted into a wall above the mantel of a fireplace. The positioning arm is pivotally movable between a retracted configuration completely inside the wall housing and a deployed configuration outside and extending away from the wall housing. The positioning arm includes gas springs and the mounting plate includes an adjustable bracket capable of mounting televisions having large VESA patterns.

23 Claims, 12 Drawing Sheets

(56) References Cited

U.S. PATENT DOCUMENTS

| | | | |
|---|---|---|---|
| 2007/0170325 A1* | 7/2007 | Ryu | F16M 11/2014 248/276.1 |
| 2010/0142137 A1* | 6/2010 | Kwak | F16M 13/02 361/679.05 |
| 2012/0061543 A1* | 3/2012 | Juan | F16M 13/02 248/291.1 |
| 2012/0167486 A1* | 7/2012 | Lee | A47B 81/062 52/125.2 |
| 2019/0309895 A1* | 10/2019 | Newville | F16M 11/046 |
| 2021/0247019 A1* | 8/2021 | Newville | F16M 13/02 |

\* cited by examiner

TILTING MOUNTING APPARATUS

REFERENCE TO RELATED APPLICATIONS

This claims the benefit of provisional patent application 63/184,864 filed May 6, 2021, tiled Tilting Mounting Apparatus, which is a continuation-in-part claiming the priority of non-provisional application U.S. Ser. No. 16/934,118 filed Jul. 21, 2020 titled Tilting Mounting Apparatus and which claims the priority of provisional patent application U.S. Ser. No. 62/874,552 filed Jul. 16, 2019 titled Tilting Mounting Apparatus, all of which are incorporated herein by reference in its entirety.

BACKGROUND OF THE INVENTION

This invention relates generally to television mounting devices and, more particularly, to a mounting apparatus that may be inset into a wall and which results in a flush wall mount for televisions big or small. In fact, the mounting apparatus is the only drop down bracket that can fit flush and is designed to recess into standard 2×4 depth walls. Further, the present invention relates to a mounting apparatus having a mounting plate pivotally coupled to a distal end of a movable positioning arm. The mounting apparatus presents a shallow wall insert profile and includes a plurality of variable tensioned gas springs and an elongate vertical bracket for mounting a large area television.

In new home construction, it is common to have a fireplace (whether an actual functioning fireplace or just a faux fireplace) having a mantel extending outwardly away from a wall and from the fireplace itself. Further, it has become common to mount a flat screen television to the wall above the fireplace and mantel. And, now, there are movable mounting arms which enable the television to be stowed near the wall above the fireplace when not in use and then rotated to position the television in front of the fireplace for viewing a television program or movie.

Unfortunately, the television or its mounting apparatus is displaced from the wall in a sloppy manner when stowed or is blocked by the mantel from being positioned correctly forward and downward of the mantel. In other words, the mounting arm, the television, and the television cables are exposed and aesthetically unattractive using currently available products and technology. In the end, a consumer may be disappointed in how his "high-end" or custom audio/visual setup appears and functions due to inadequate mounting devices. Further, current products and proposals do not provide an efficient solution to the problem of a television making contact with a fireplace mantel as it pivots or rotates from a stowed position above the mantel to a deployed position forward and downward of the mantel, e.g., into a comfortable viewing position. In addition, there is still not a design having a shallow inset housing having a positioning arm and mounting plate completely retractable into the housing and which is capable of mounting even large televisions in a completely flush wall mount configuration. Another common short-coming of existing television mounting arms is the limitation on how large a television can be mounted, extended, and retracted—based on size or weight.

Therefore, it would be desirable to have a mounting apparatus that is movable between a retracted or stowed configuration at which the flat-screen television is flush with a wall above a mantel and a deployed configuration that tilts or pivots in order to clear a profile of a mantel and so that the television may be positioned in front of the fireplace. Further, it would be desirable to have a mounting apparatus operated by gas springs and having an adjustable mounting bracket for mounting a television having a large VESA pattern and higher weight.

SUMMARY OF THE INVENTION

A mounting apparatus for positioning a television relative to a wall and a fireplace mantel according to the present invention includes a mounting plate operably coupled to a distal end of a positioning arm so as to be moved and positioned according to movement of the positioning arm. The positioning arm has a linear configuration with a proximal end mounted to a rear section of an inset wall housing which is itself mounted into a wall above the mantel of a fireplace within a home. The inset housing may be installed without modification of standard 2×4 framing. The positioning arm is pivotally movable between a retracted configuration completely inside the wall housing and a deployed configuration outside and extending away from the wall housing sufficiently such that the mounting plate (and television attached to the plate) is forward of and then below the outwardly extending mantel.

Of critical importance to the present invention is that the positioning arm is moved by operation of a plurality of gas springs whose position is adjustable depending on the weight of a television being coupled to the mounting plate. Also critical is a vertical adjustment bracket that is mounted to a front surface of the mounting plate by which to mount a large television of a type having a large VESA pattern. In addition, the mounting plate is operable to tilt outwardly so as to clear the mantel and to swivel side to side at the viewing discretion of a user.

Flat-panel television sets continue to get larger and larger, each having its own VESA pattern for mounting, such as on a wall or a specialty mounting bracket. It is understood that a VESA pattern refers to the configuration of the (typically) four mounting holes on the back of a flat panel TV or computer monitor. For example, in a 100×100 mm VESA pattern, the screw holes are arranged in a square 100 mm apart. Therefore, it would be desirable to have an adjustable mounting bracket 402 in the present apparatus 100 so as to be capable of mounting both very small and very large flat-panel television sets, i.e., adjustable to accommodate larger or smaller visa patterns.

Therefore, a general object of this invention is to provide a mounting apparatus that enables a television to, at first, be mounted neat and flush against a wall above a fireplace mantel and then to be moved outwardly and downwardly to a position in front of the mantel for viewing.

Another object of this invention is to provide a mounting apparatus, as aforesaid, having a mounting plate at an outer end of a movable positioning arm that may be tilted to avoid contact with the mantel as the arm is moved between retracted and deployed positions.

Yet another object of this invention is to provide a mounting apparatus, as aforesaid, in which at least one gas spring is operatively coupled to the positioning arm such that larger and heavier televisions may be movably deployed from a wall position above a mantel.

Still another object of this invention is to provide a mounting apparatus, as aforesaid, in which the mounting plate may be swiveled side to side at the viewing discretion of a person watching the television.

A further object of this invention is to provide a mounting apparatus, as aforesaid, having a pair of vertical and variable position brackets coupled to a mounting plate capable of mounting oversized and heavy televisions.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a top view of the mounting apparatus as in FIG. 1a;

FIG. 2b is a top view of the mounting apparatus as in FIG. 2a;

FIG. 3a is a side view of the mounting apparatus as in FIG. 1a;

FIG. 3b is a side view of the mounting apparatus as in FIG. 2a;

FIG. 6b is an isolated view on an enlarged scale taken from FIG. 6a;

FIG. 7a is a perspective view from a rear perspective of the mounting apparatus as in FIG. 6a;

FIG. 7b is an isolated view on an enlarged scale taken from FIG. 7a;

FIG. 7c is an isolated view on an enlarged scale taken from FIG. 7a;

FIG. 8b is a perspective view taken from a rear perspective of the mounting apparatus as in FIG. 8a;

FIG. 8d is an isolated view on an enlarged basis taken from FIG. 8a;

FIG. 10b is an isolated view on an enlarged basis taken from FIG. 10a;

FIG. 10c is a top view of the mounting apparatus shown in FIG. 10a;

DESCRIPTION OF THE PREFERRED EMBODIMENT

A mounting apparatus for positioning a television forward of a fireplace mantel according to a preferred embodiment of the present invention will be described with reference to FIGS. 1a to 11b of the accompanying drawings. The mounting apparatus 100 includes an inset wall housing 200, a positioning arm 300, and a mounting plate 400.

Figure 4:
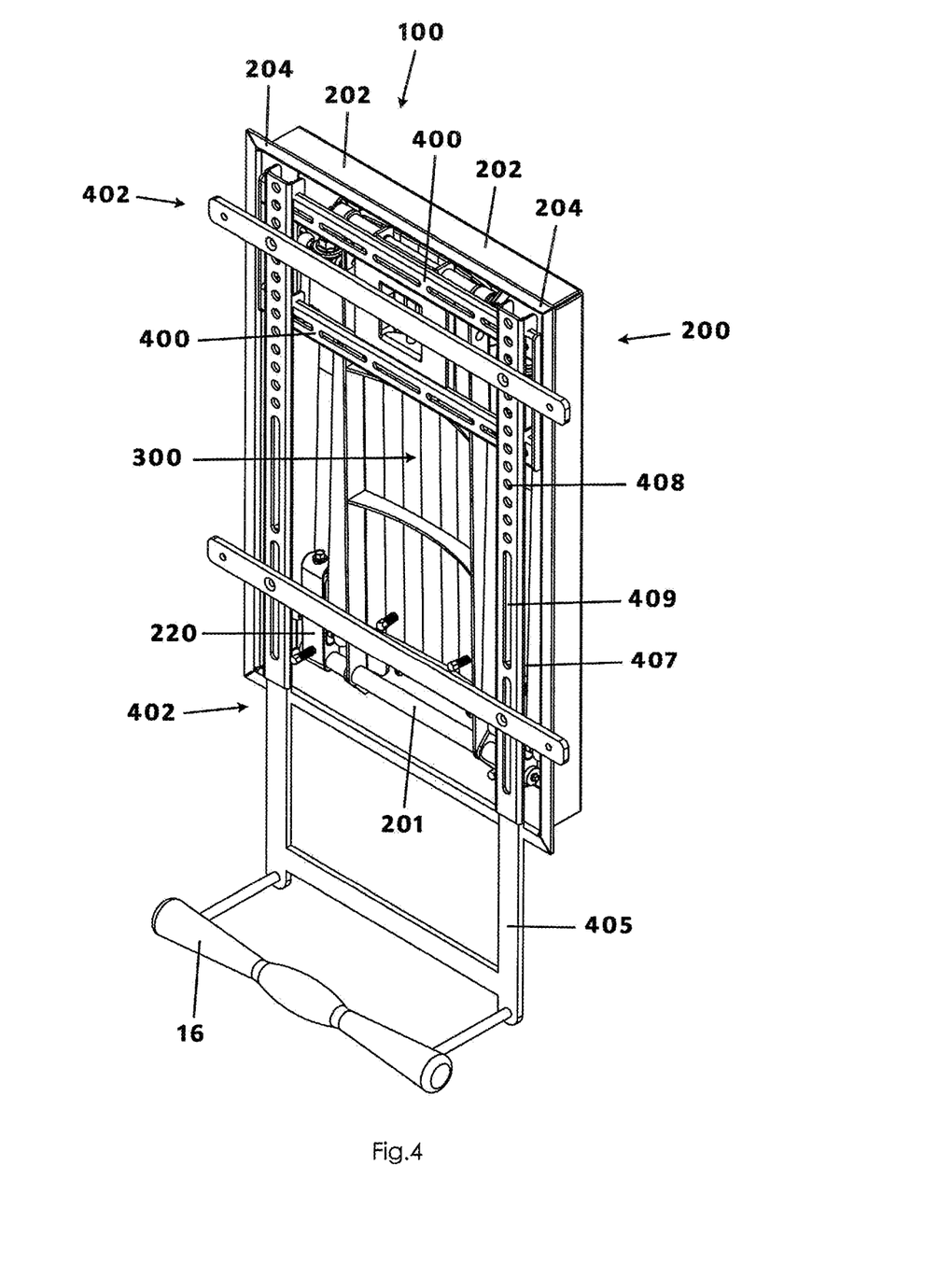
FIG. 4 is a front perspective view of the mounting apparatus as in FIG. 1a with the television removed for clarity.
Figure 5:
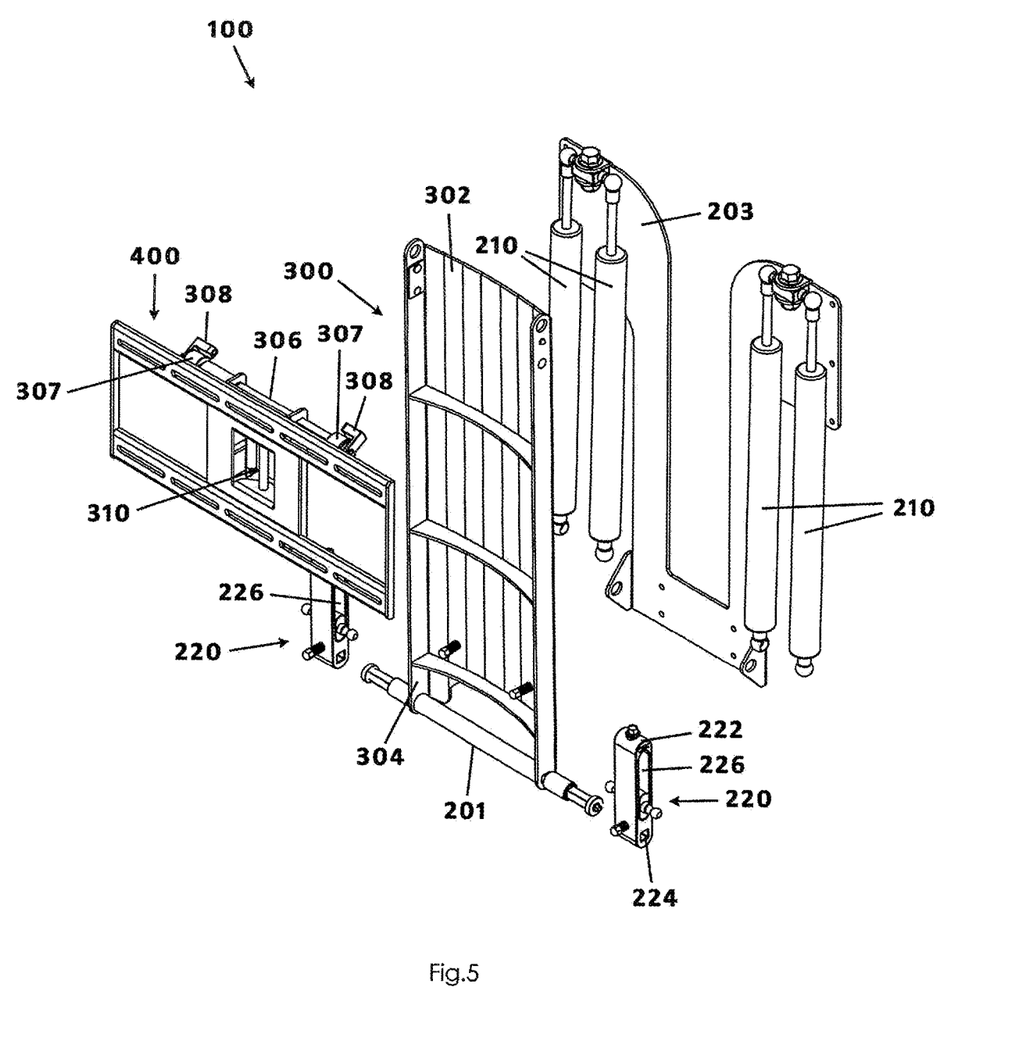
FIG. 5 is an exploded view of the mounting apparatus as in FIG. 4 with the television removed for clarity.

The mounting apparatus 100 includes a wall housing 200 that must first be installed in a wall 12 above a fireplace mantel 14. The wall housing 200 includes a rear section 202 inset into the wall 12 and a front section 204 forward of said rear section 202 defining an open front opposite the rear section 202 and defines an interior area, the open front being flush with a front surface of the wall 12. The front section 204 may have a profile (dimensions) that is larger than the rear section 202 and the interior areas of the front section 204 and rear section 202 are in communication with one another, i.e., the wall housing 200 is hollow or, stated another way, defines an interior area that closed to the rear and open to the front. It is critical to the function of the present invention that the wall housing 200 is inset into a wall of a residence so that a television can be mounted flat against the wall and that the mounting arm 300 may be stowed inside the inset wall housing 200 when retracted (FIG. 4). Preferably, the wall housing 200 includes side walls connecting the rear section 202 and the open front and have dimensions such the open interior is only about two inches deep and so that the inset housing 200 may be installed between adjacent studs in traditional 2×4 construction without modifying the wall structure rearwardly or laterally.

Figure 1A:
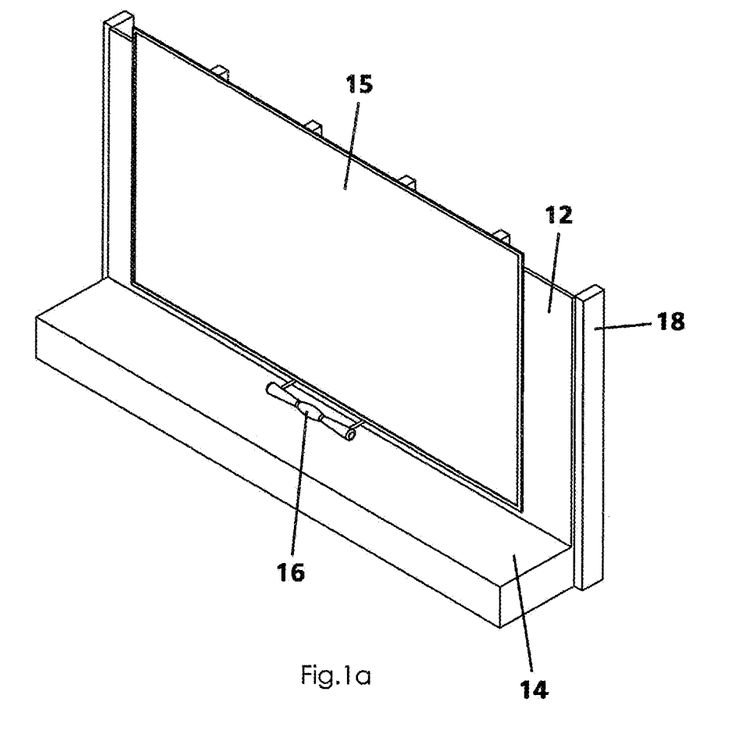
FIG. 1a is a perspective view of a mounting apparatus according to a preferred embodiment of the present invention and illustrated in a fully retracted configuration against a wall and above a mantel.
Figure 1B:
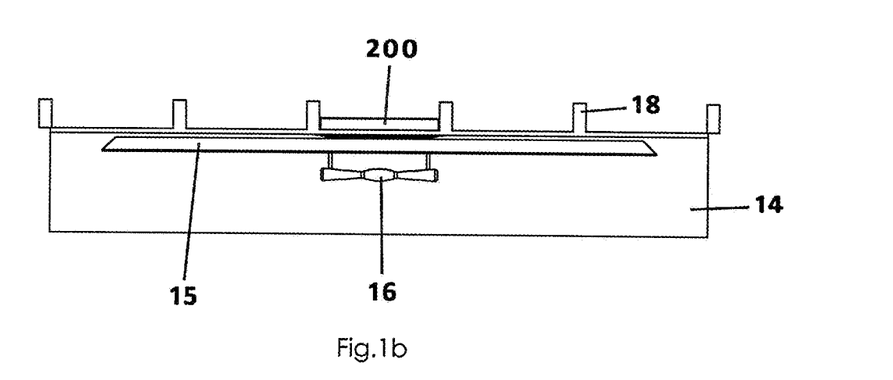
Figure 2A:
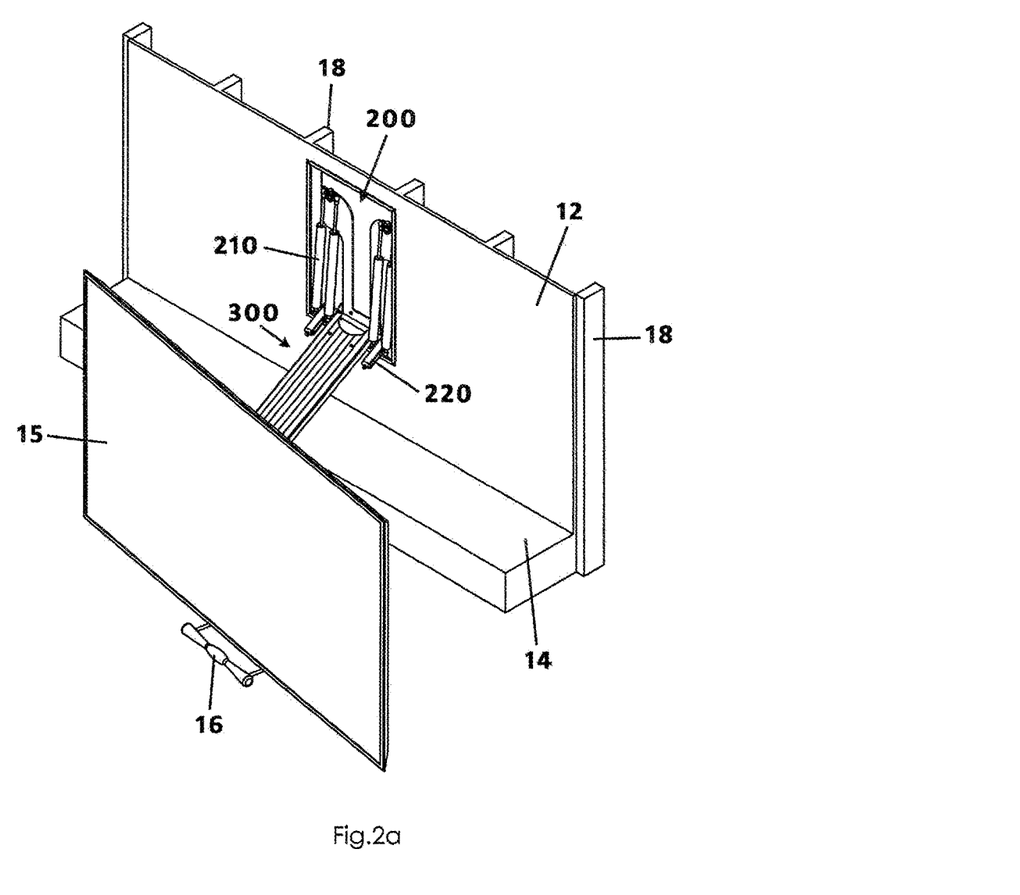
FIG. 2a is a perspective view of the mounting apparatus as in FIG. 1, illustrated in a partially deployed and swiveled configuration.
Figure 2B:
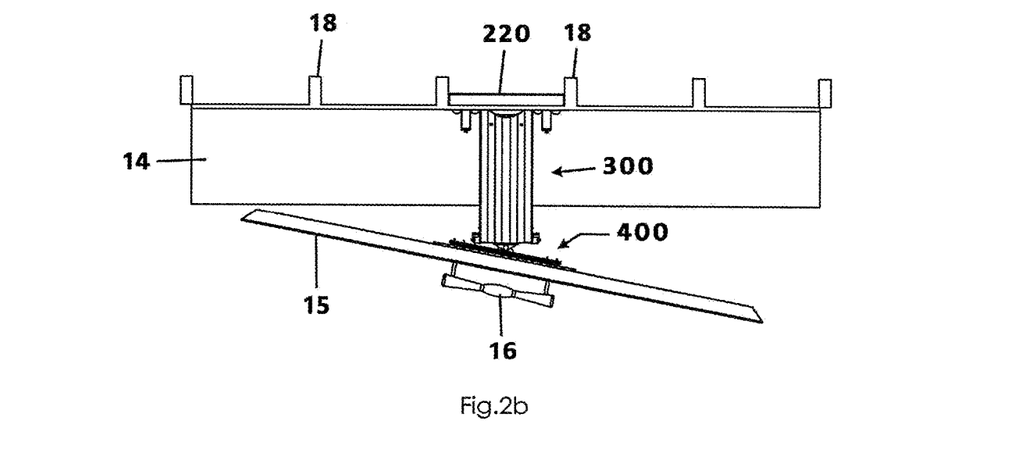
Figure 3A:
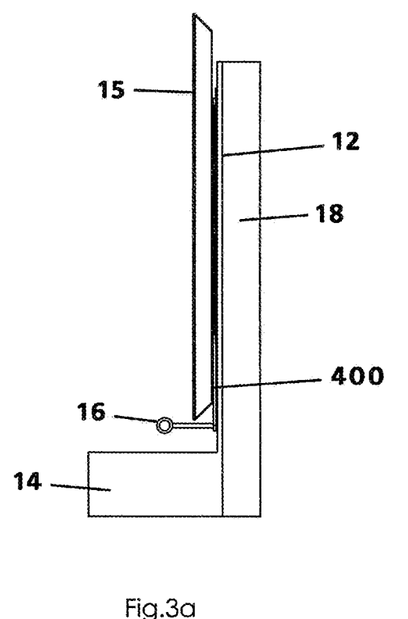
Figure 3B:
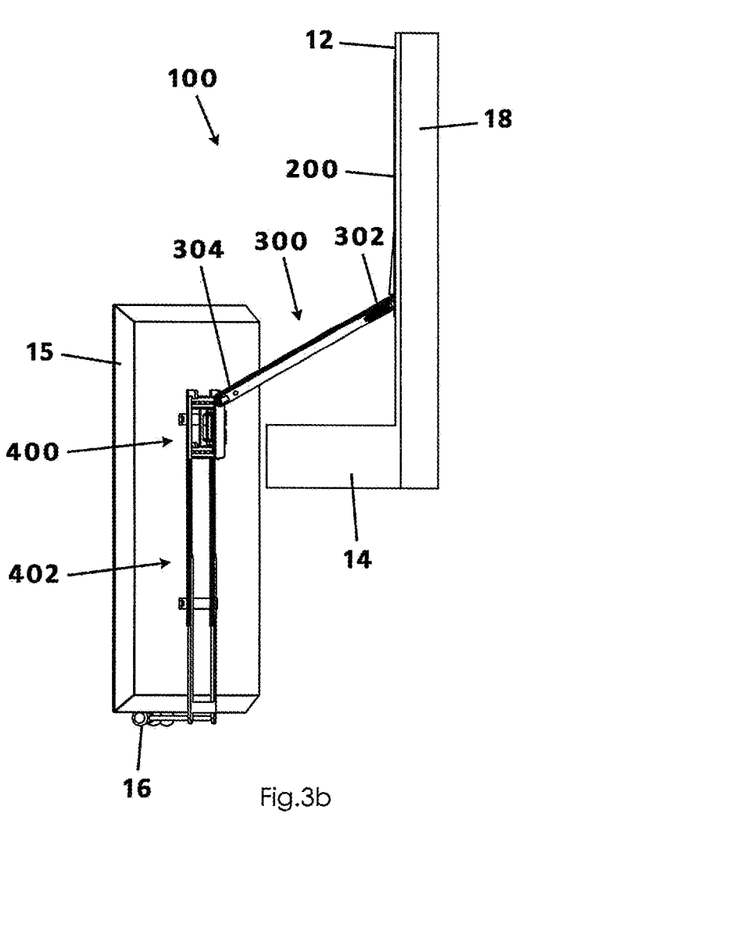
Figure 8A:
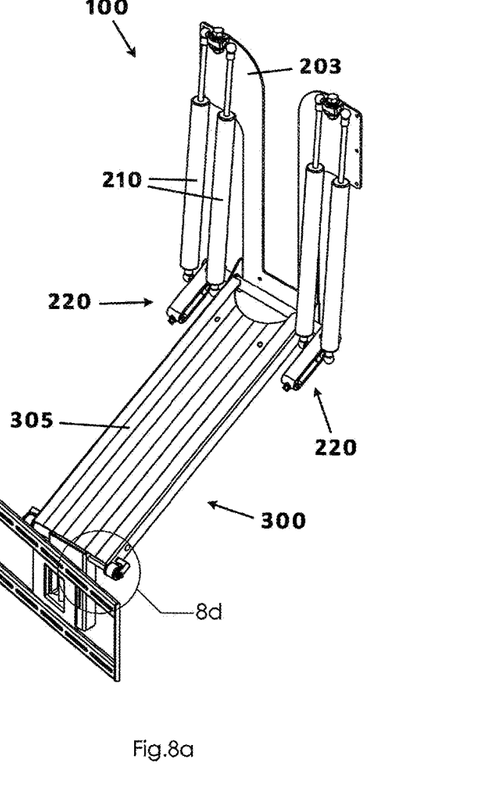
FIG. 8a is a perspective view of the mounting apparatus in a fully deployed configuration.
Figure 8B:
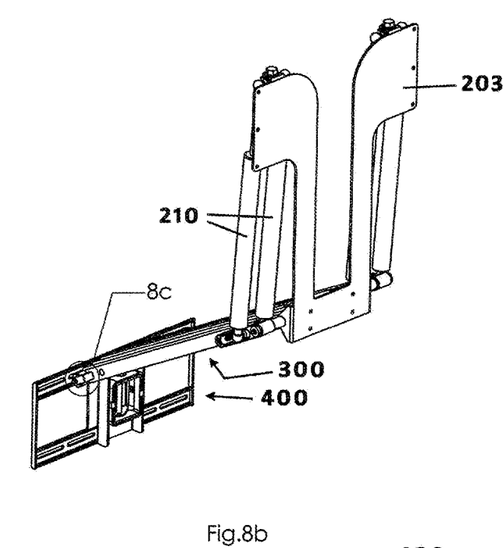
Figure 8C:
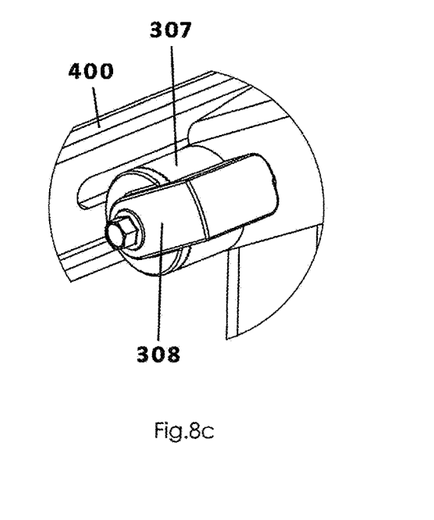
FIG. 8c is an isolated view on an enlarged basis taken from FIG. 8b.
Figure 8D:
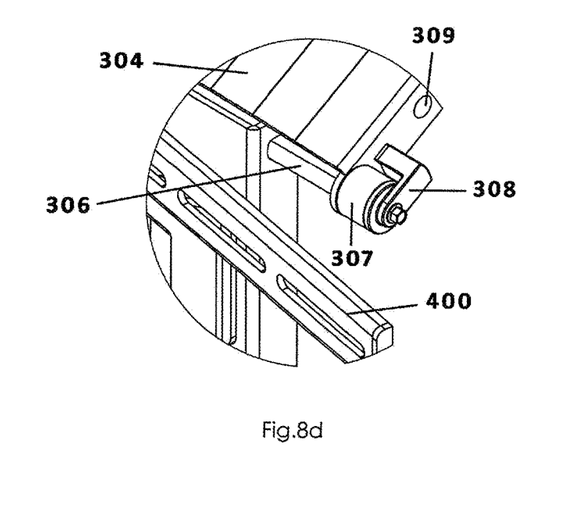

The positioning arm 300 includes a distal end 304 opposite the proximal end 302 and a body portion 305 that extends between the two ends, the positioning arm 300 having a generally linear configuration (FIG. 8a). However, portions of the body portion 305 may include an arcuate or even hemispherical configuration that may provide enhanced strength for use with heavier televisions. The positioning arm 300 is movable between a stowed configuration positioned completely inside the interior area (FIG. 4) and a deployed configuration extending at least partially outside of and extending away from the interior area (FIGS. 2a and 3b). The positioning arm 300 includes a proximal end 302 fixedly coupled to a base axle 201 which is positioned entirely inside the interior area of the inset housing 200. It is understood that the base axle 201 rotates when the positioning arm 300 rotates and vice versa. The base axle 201 is itself coupled to the inset housing 200 and so it is implied and accurate to say that a proximal end 302 of the positioning arm 300 is operatively coupled to the housing 200.

The distal end 304 may include a mounting shaft 306 having a tubular or D-shaped configuration and coupled to the mounting plate 400, a boss 307, and a position lock arm 308. More particularly, the mounting shaft 306 is free to turn free of interference by the positioning arm 300, such as with a bearing coupled to the boss 307. The mounting shaft 306 is the primary linkage joining the positioning arm 300 to the mounting plate 400. The effect of this structure is that the mounting plate 400 is pivotally coupled to the distal end 304 of the positioning arm 300 and may be selectively tilted—namely, a lower edge of the mounting plate 400 may be tilted outwardly and forwardly so as to clear the mantel 14.

Boss 307 includes an internal pocket that is also D-shaped and is coupled to the mounting shaft 306 for rotation thereby. Further, the position lock arm 308 is keyed to the boss 307 with teeth (not shown), the position lock arm 308 being configured to index into position with the spring position button 309. In other words, the position lock arm 308 can be indexed to a user-determined position, i.e., to the exact angle or degree of deployment desired. And, in use, when that position is reached, a spring-loaded position button 309 may pop out (FIG. 7c).

In another aspect, the mounting plate 400 may include a handle 16 by which the mounting plate 400 and positioning arm 300 may be moved between the stowed configuration and deployed configuration (FIG. 2a).

Figure 6A:
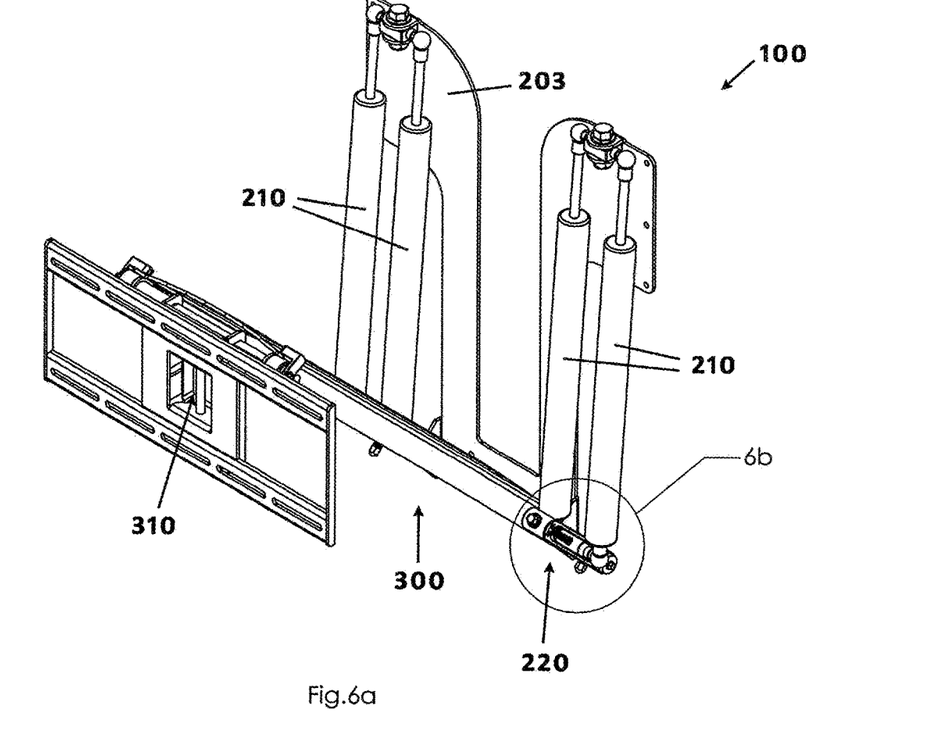
FIG. 6a is a perspective view of the mounting apparatus as in FIG. 2a, illustrating the mounting apparatus in a partially deployed configuration.

In still another aspect, the positioning arm 300 is moved between the stowed configuration and deployed configuration via an actuator, namely, at least one gas spring 210 and, in an embodiment, a plurality of gas springs 210 (FIG. 6a). It is understood that the number and type of each gas spring may depend on the size and weight of a television 15 intended to be coupled thereto and on the gas springs 210 being positioned appropriately as will be described in more detail later. In an embodiment, a pair of gas springs 210 is mounted to a backplate 203 and positioned within the interior area defined by the housing 200—one on either side of the positioning arm 300 but not conflicting with pivotal movement of the positioning arm 300. In other words, the at least a pair of gas springs 210 and the positioning arm 300 are positioned completely inside of the interior area when the positioning arm 300 is in the stowed configuration.

The pair of gas springs 210 may be operably coupled, such as at their upper extent, respectively, to a backplate 203 and to the proximal end 302 of the positioning arm 300 (FIG. 5) via the base axle 201 and linkage so as to be operable, when actuated, to cause the positioning arm 300 to move from the stowed configuration inside the interior area of the wall housing 200 to the deployed configuration outside the wall housing 200. Or, stated more accurately, the gas springs 210 may receive and store the energy from a pivotal movement of the positioning arm 300 as described below.

For context, a gas spring is a sort of spring-loaded hinge that may be compressed and thereby stores energy until the compression is released at which time the energy is released and thereby returns an object to its original position (or makes it easier for a person to raise an object). For example, a heavy trunk lid or SUV rear door is easier for a car owner to raise because a released gas spring helps. A gas spring is a piston-cylinder combination filled with pressurized nitrogen gas that allows the spring to store energy, while the oil damps (slows and smooth) the movement of the piston and also provides lubrication. An important characteristic of gas springs is that they work slowly and smoothly. The end of the piston is designed so the fluid inside the cylinder (gas and liquid) can flow through or around it very slowly. Gas springs are usually designed with a particular size of load in mind so they expand very smoothly at a particular rate (so many centimeters or inches per second).

Much like metal springs, gas springs come in all different sizes. You can choose one with just the right size of cylinder and piston and the right amount of gas pressure to give precisely as much force in the spring as you need to do a particular job. For instance, to support the trunk lid of a car, two gas springs are needed—one on either side to provide roughly as much force when they're compressed as the weight of the lid. For a gas-lift office chair, one needs the spring to provide a little bit more force than the weight of the seat. In most chairs, the spring doesn't actually support the person's weight. Instead, it typically has a lever attached that grips and locks at a certain height, preventing the seat from moving up or down any further. The spring is simply designed to let the seat move up and down gently without having to supply much force.

With more particular description of how gas springs may be incorporated into the present invention, a framework is mounted and positioned in the interior area of the inset housing 200 and a rod referred to as a base axle 201 having a linear configuration is rotatably coupled to the framework and operably coupled to the pair of gas springs with a linkage 212 (to be described later) having a configuration that causes the positioning arm 300 to pivot from the stowed configuration to the deployed configuration when the base axle 201 is rotated in a respective direction. It is understood that the base axle 201 may be fixedly attached to the proximal end 302 of the positioning arm 300 so that the positioning arm 300 will pivot when the base axle 201 is rotated. The weight of the positioning arm 300 (and of a television attached to a distal end thereof via mounting plate 400) is supported by the pair of gas springs 210 via the linkage 212.

With further description of the linkage 212, a pair of gas springs 210 (or more) may be associated with either side of the positioning arm 300, each pair of gas springs 210 being coupled together via a sub-axle which is then operatively coupled to the base axle 201 described previously. Thus, the power of multiple gas springs 210 may be ganged together via a pivot arm 214 for use in supporting and moving the weight of the positioning arm 300 and television mounted thereto. In any case, a force of the gas springs may be translated to the positioning arm 300 via the base axle 201. Or, described in an inverse manner, forces from movement of the positioning arm 300 may be "stored and later released" by the gas being compressed by the gas springs 210.

Figure 6B:
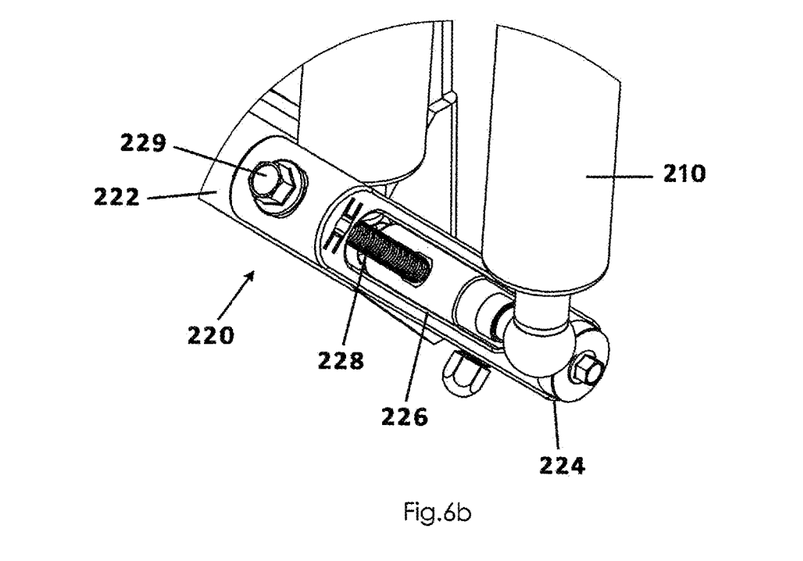
Figure 7A:
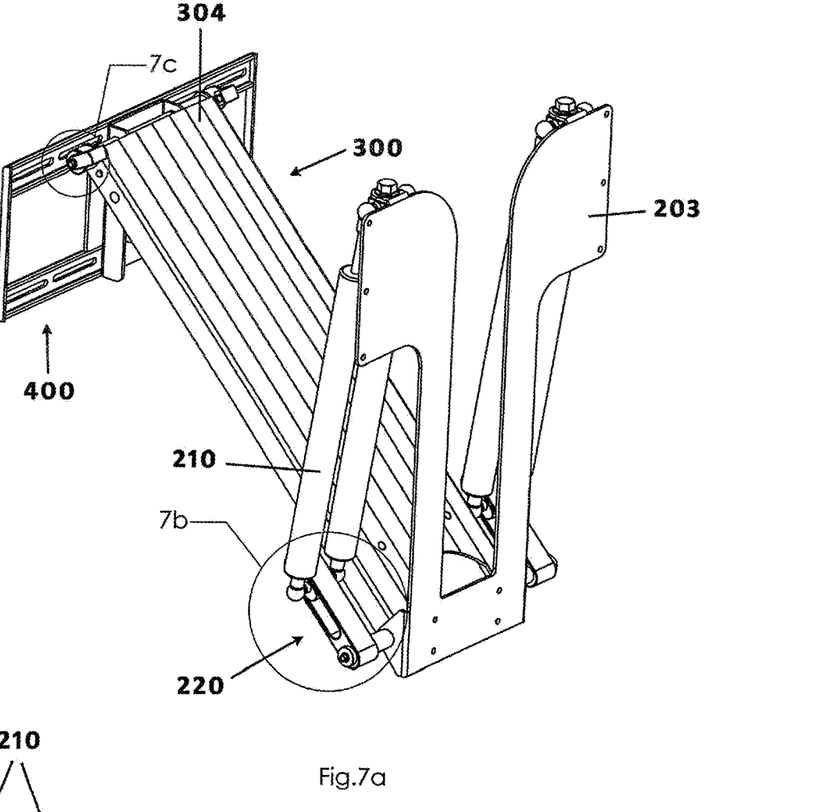
Figure 7B:
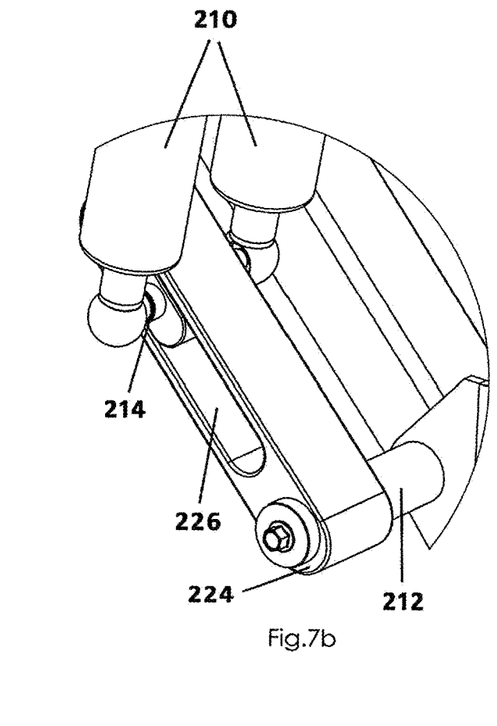
Figure 7C:
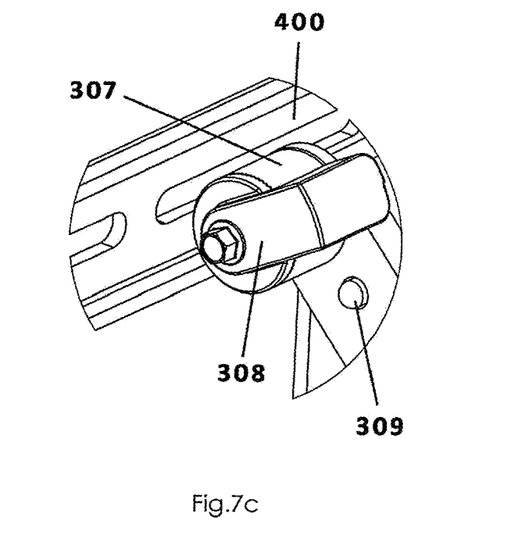

Further, the gas spring 210 or each pair of gas springs 210 may include an adjustable mount block 220 having a first end 222 coupled to the base axle 201 and a second end 224 displaced from the first end 222, the adjustable mount block 220 defining a channel 226 therebetween to allow adjustment of a position of the gas springs 210 (FIG. 7b). Notably, this connection to the base axle 201 provides the operative connection to movement of the positioning arm 300. It will be understood that the position of the ends of the gas springs are movable along the channel 226 between the first end 222 and the second end 224 and it is this movement that enables the gas springs to support a heavy television (FIG. 7b) or a light television (FIG. 6b). In the case of a pair of gas springs 210 positioned on either side of the positioning arm 300, respective strut mounts may be coupled together via a linkage that extends through the channel 226 of the respective adjustable mount block 220. In other words, the strut mounts of respective gas springs 210 are shown in the forward position appropriate for supporting a heavy TV in FIGS. 7a and 7b whereas they are shown in the rearward position appropriate for supporting a light TV in FIGS. 6a and 6b. It will be understood that an adjustable mount block 220 may be easily adjusted forwardly or rearwardly by turning the threaded bolt 228 shown in FIG. 6b. Specifically, rotation of the bolt head 229 in one direction will threadably draw the gas springs forwardly while rotation of the bolt head in the other direction will threadably push the gas springs rearwardly.

Therefore, it is critical in the present invention that the positioning arm 300 is operated by the actuation of at least one gas spring 210 operably coupled to the positioning arm 300. This, in conjunction with the elongate and vertical mounting bracket 402 coupled to the mounting plate 400, mounting of oversized televisions is possible even using a shallow wall insert without modifying standard wall framing.

In an embodiment, the rear side 406 of the mounting plate 400 is coupled to a swiveling assembly 310 which is then coupled to the distal end 304 of the positioning arm 300, the swiveling assembly 310 including an upstanding fastener 312—such as a vertically mounted bolt or rod—defining a vertical axis about which the mounting plate 40 may be selectively swiveled between a left viewing configuration and a right viewing configuration (FIGS. 9a to 10f). In use, a user may desire to swivel the television to the left or to the right to accommodate if persons are seated to the left or right of the television, respectively.

Figure 9A:
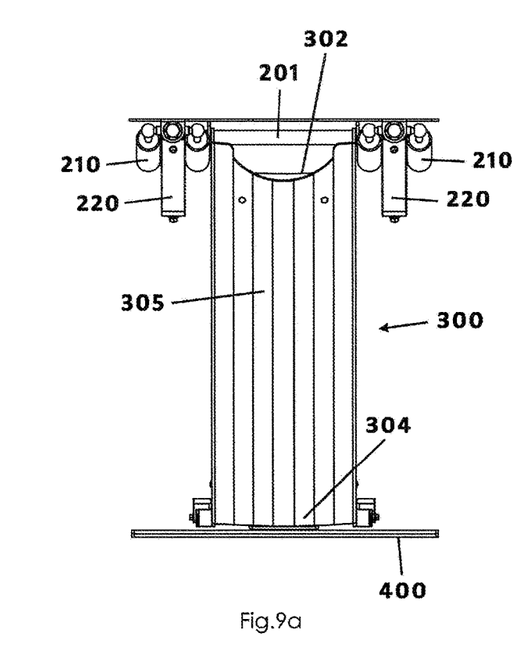
FIG. 9a is a perspective view of the mounting apparatus as in FIG. 7a, illustrated with the swiveling assembly in a retracted configuration which prevents swiveling.
Figure 9B:
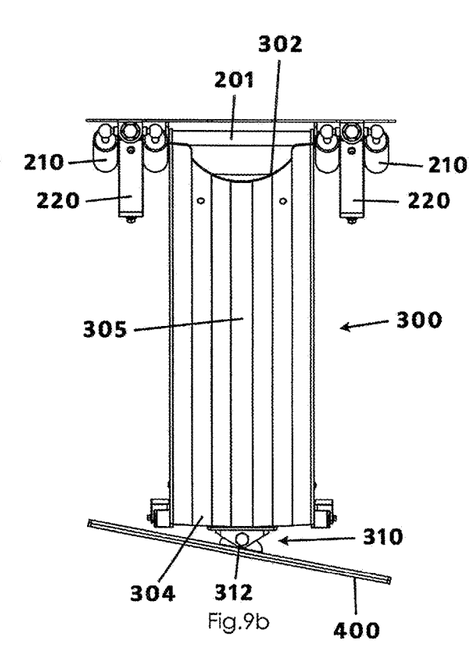
FIG. 9b is a perspective view of the mounting apparatus as in FIG. 9a, illustrated with the swiveling assembly in a deployed configuration which allows swiveling.
Figure 10A:
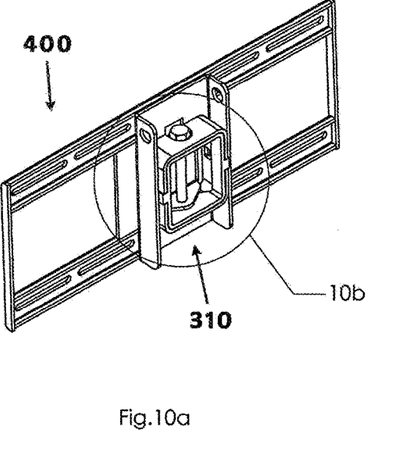
FIG. 10a is a rear perspective view of the mounting plate according to the present invention, illustrated with the swivel assembly in a retracted configuration.
Figure 10B:
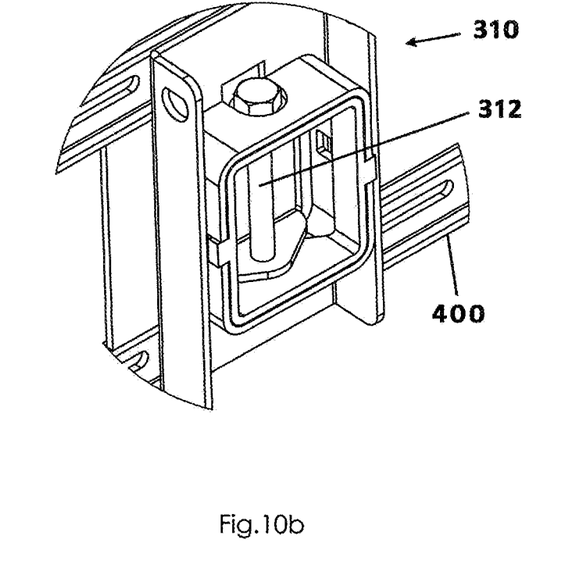
Figure 10C:
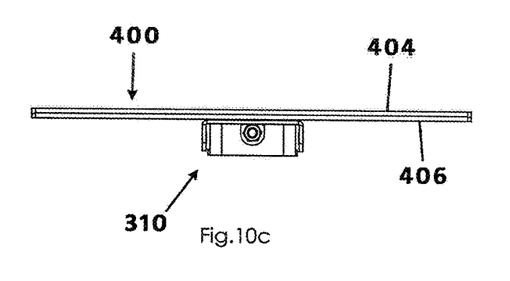
Figures 10D, 10F:
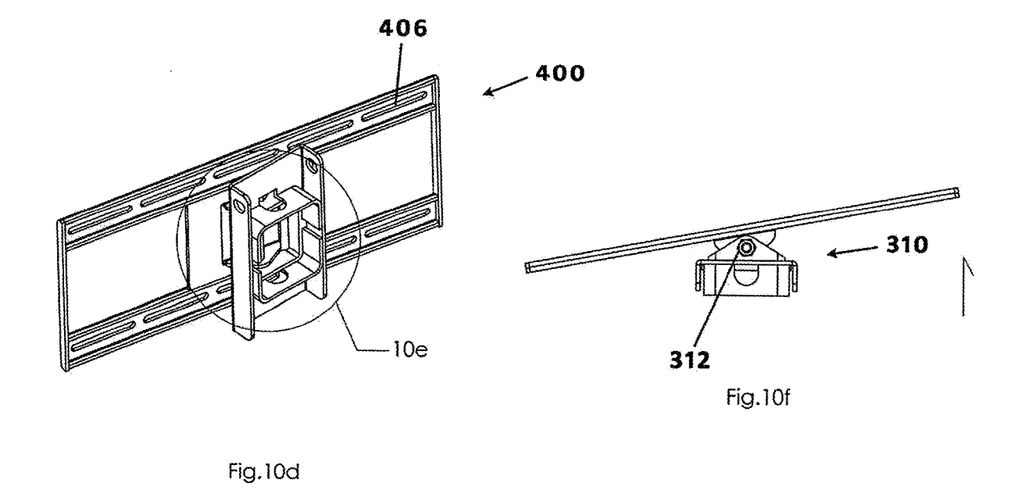
FIG. 10d is a rear perspective view of the mounting plate according to the present invention, illustrated with the swivel assembly in a slidably deployed configuration.
FIG. 10f is a top view of the mounting apparatus shown in FIG. 10d.
Figure 10E:
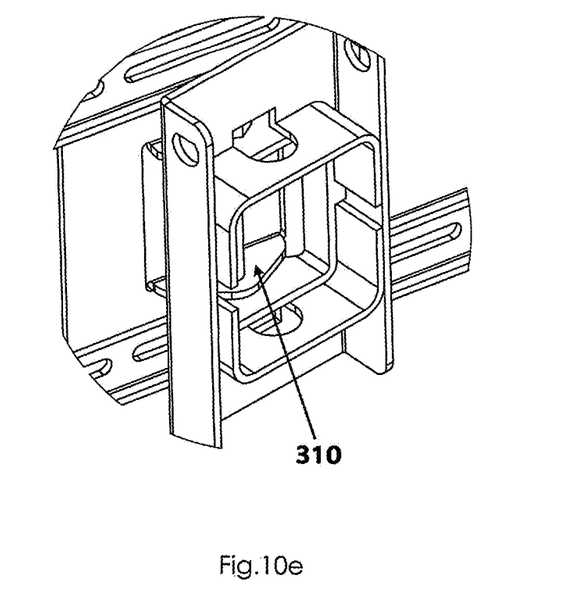
FIG. 10e is an isolated view on an enlarged basis taken from FIG. 10d.
Figure 11A:
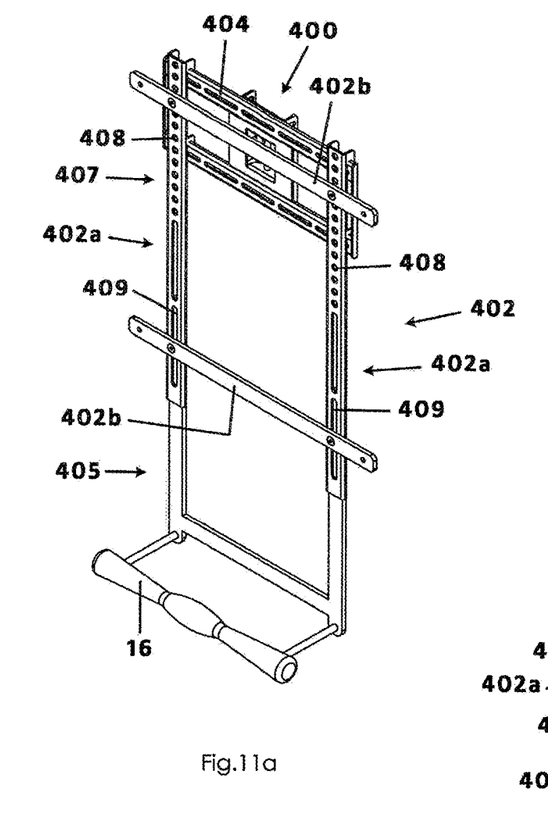
FIG. 11a is an isolated view of a VESA pattern bracketing assembly of the mounting apparatus of FIG. 4, illustrated in a retracted configuration.
Figure 11B:
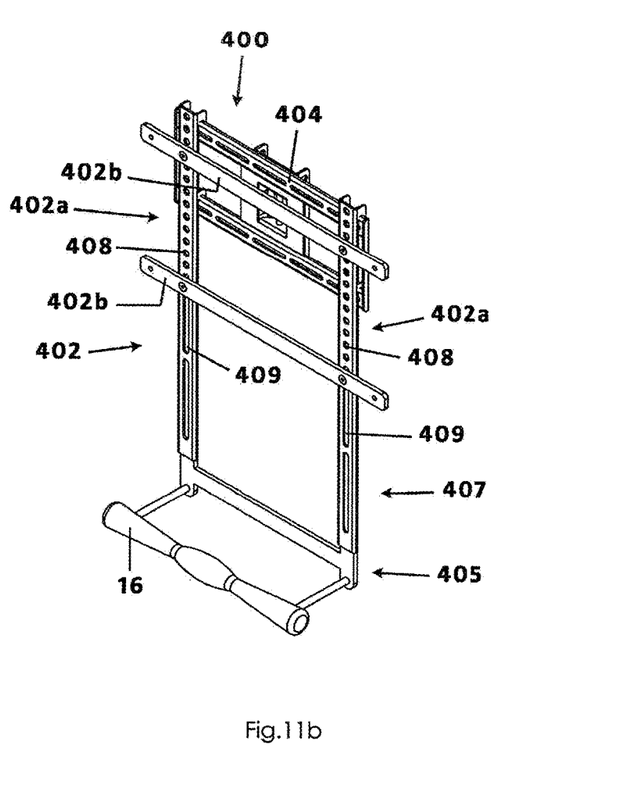
FIG. 11b is an isolated view of a VESA pattern bracketing assembly of the mounting apparatus of FIG. 4, illustrated in a deployed configuration.

In an embodiment, the swiveling assembly 310 is slidably coupled to the distal end 304 of the positioning arm 300 and is selectively movable between a retracted configuration at which the mounting plate 400 is immediately adjacent the distal end 304 of the positioning arm 300 (FIG. 9a) and a deployed configuration at which the mounting plate 400 is offset from the distal end 304 of the positioning arm 300 (FIG. 9b). In other words, the mounting plate 400 is incapable of being swiveled when the swiveling assembly 310 is at the retracted configuration (FIG. 9a) but, by contrast, is capable of swiveling to the left or to the right when the swiveling assembly 310 is at the deployed configuration (FIG. 9b) because it is then sufficiently displaced or extended from the distal end 304 of the positioning arm 300.

Flat-panel television sets continue to get larger and larger, each having its own VESA pattern for mounting, such as on a wall or a specialty mounting bracket. It is understood that a VESA pattern refers to the configuration of the (typically) four mounting holes on the back of a flat panel TV or computer monitor. For example, in a 100×100 mm VESA pattern, the screw holes are arranged in a square 100 mm apart. Therefore, it would be desirable to have an adjustable mounting bracket 402 in the present apparatus 100 so as to be capable of mounting both very small and very large flat-panel television sets, i.e., adjustable to accommodate larger or smaller VESA patterns. Specifically, the mounting apparatus 100 includes an adjustable mounting bracket 402 that provides that structure and functionality and is mounted to the front side 404 of the mounting plate 400 by which to mount large surface area televisions. This includes embodiments in which the adjustable mounting bracket 402 may change in size or orientation or if its position is movable about the mounting plate 400. In the embodiment shown in FIGS. 4, 11a, and 11b, the mounting bracket 402 may include a pair of vertical bracket sections 402a that are laterally spaced apar and each defining a plurality of mounting holes 408 and mounting slots 409 to which a television 15 may be aligned and secured with appropriate fastening hardware. As shown particularly in FIGS. 11a and 11b, each vertical mounting bracket 402a may include a lower portion 405 slidably receivable in an upper portion 407 and configured for slidable movement between retracted and deployed configurations. In addition, each adjustable mounting bracket 402 may include a pair or horizontal struts 402b for adjustable attachment to a TV having a respective VESA pattern. Note that a lower horizontal strut may be vertically slidable and attachable (such as wing nuts or similar fasteners) within respective slots 409 of respective vertical adjustment sections 402a (compare FIGS. 11a and 11b). The handle 16 may be coupled to a lower end of respective lower portion 405 of respective vertical adjustment sections 402a. Accordingly, the adjustable mounting bracket 402 may be adjusted vertically in two ways and horizontally to accommodate attachment to virtually any television set large or small and any VESA pattern.

In use, the mounting apparatus 100 enables a television 15 to be neatly retracted flush with a wall above fireplace mantel 14 or to be extended (i.e., lowered) away from the wall via a positioning arm 300 to a position in front of or below the mantel 14. In other words, the mounting apparatus 100 and television may be retracted and stowed in a manner that hides the extension apparatus, cords, or any other hardware and then deployed away from the wall by a user desiring to watch television at a comfortable height and lateral position. The television mounting plate 400 is pivotally coupled to the positioning arm 300 so as to tilt outwardly to avoid contact with a mantel 14. Further, the mounting apparatus 100 is specifically configured for mounting televisions having a large visa pattern and heavy weight considerations while still being able to retract to a flush wall mount while inserting only a shallow wall insert into normal house framing.

It is understood that while certain forms of this invention have been illustrated and described, it is not limited thereto except insofar as such limitations are included in the following claims and allowable functional equivalents thereof.

The invention claimed is:

1. A mounting apparatus for positioning a television having a VESA pattern relative to a wall and a fireplace mantel so that the television is positioned flush against an exterior surface of the wall, said mounting apparatus comprising:
   a wall housing inset into the wall and defining an open front and an interior area, said open front being flush with a front surface of the wall;
   a positioning arm having a proximal end pivotally coupled to said wall housing and a distal end opposite said proximal end and a body portion having a linear configuration extending between said proximal and distal ends,
   said positioning arm being pivotally movable between a stowed configuration positioned completely inside said interior area and a deployed configuration extending at least partially outside of and extending away from said interior area;
   a mounting plate coupled to said distal end of said positioning arm and positioned inside said interior area at said stowed configuration and positioned outside said interior area at said deployed configuration;
   a vertical adjustment bracket coupled to a front portion of said mounting plate for securing the television to said mounting plate, said vertical adjustment bracket being one of expandable or slidably movable between said retracted and said deployed configurations so to accommodate and attach to the VESA pattern of the television.

2. The mounting apparatus as in claim 1, wherein said proximal end of said positioning arm is fixedly coupled to a base axle situated in said interior area and which has a tubular configuration, said base axle being rotated when said positioning arm is actuated.

3. The mounting apparatus as in claim 2, further comprising at least a pair of gas springs each having an upper end coupled to a backplate positioned inside said interior area of said inset housing and a lower end operatively coupled to said base axle so as to be actuated when said positioning arm is actuated.

4. The mounting apparatus as in claim 3, further comprising at least a pair of adjustable mount blocks each having a first end coupled to the base axle and a second end opposite said first end, each said adjustable mount block defining a channel between said first and second ends;
wherein said lower end of a respective gas spring is situated in said channel.

5. The mounting apparatus as in claim 4, wherein said each adjustable mount block includes:
a threaded fastener coupled to said lower end of a gas spring for slidably moving said lower end forwardly or rearwardly along said channel when actuated.

6. The mounting apparatus as in claim 1, wherein said mounting plate is pivotally coupled to said distal end of said positioning arm and so as to define a horizontal axis about which the mounting plate is selectively pivoted between a normally upstanding configuration and a tilted configuration in which a bottom edge of said mounting plate is extended outwardly and forwardly.

7. The mounting apparatus as in claim 1, wherein said mounting plate includes a rear portion opposite said front portion that is coupled to a swiveling assembly that is, in turn, coupled to said distal end of said positioning arm, said swiveling assembly having an upstanding fastener that defines a vertical axis about which said mounting plate is selectively swiveled between a left viewing configuration and a right viewing configuration.

8. The mounting apparatus as in claim 7, wherein said upstanding fastener is one of a bolt or a rod.

9. The mounting apparatus as in claim 7, wherein said swiveling assembly is slidably coupled to said distal end of said positioning arm and selectively movable between a retracted configuration at which said mounting plate is immediately adjacent said distal end of said positioning arm and a deployed configuration at which said mounting plate is displaced from said distal end of said positioning arm.

10. The mounting apparatus as in claim 1 further comprising a handle coupled to said adjustment bracket and extending outwardly.

11. A mounting apparatus for positioning a television relative to a wall and a fireplace mantel, said mounting apparatus comprising:
a wall housing includes a rear section inset into the wall and having a rear wall and a front section forward of said rear section and defining an open front and an interior area, said open front being flush with a front surface of the wall;
a positioning arm having a proximal end coupled to said rear section of said wall housing and a distal end opposite said proximal end and a body portion having an elongate configuration extending between said proximal and distal ends,
said positioning arm being pivotally movable between a retracted configuration positioned completely inside said interior area and a deployed configuration extending at least partially outside of and extending away from said interior area;
wherein said proximal end of said positioning arm is fixedly coupled to a base axle situated in said interior area and which has a tubular configuration, said base axle being rotated when said positioning arm is actuated;
a mounting plate coupled to said distal end of said positioning arm, said mounting plate having a front portion operatively coupled to the television and having a rear portion opposite said front portion;
wherein said mounting plate is pivotally coupled to said distal end of said positioning arm so as to define a horizontal axis about which the mounting plate is selectively pivoted between a normally upstanding configuration and a tilted configuration in which a bottom edge of said mounting plate is extended outwardly and forwardly of the mantel; and
a vertical adjustment bracket coupled to a front portion of said mounting plate for securing the television to said mounting plate, said vertical adjustment member having at least a pair of arms that are slidably and selectively adjustable so to accommodate and attach to a VESA pattern of the television.

12. The mounting apparatus as in claim 11, further comprising a swiveling assembly coupled to said rear portion of said mounting plate, said swiveling assembly having an upstanding fastener that defines a vertical axis about which said mounting plate is selectively swiveled between a left viewing configuration and a right viewing configuration.

13. The mounting apparatus as in claim 11, further comprising at least a pair of gas springs each having an upper end coupled to a backplate inside said said rear section of said wall housing and a lower end operatively coupled to said base axle so as to be actuated when said positioning arm is actuated.

14. The mounting apparatus as in claim 13, further comprising at least a pair of adjustable mount blocks each having a first end coupled to the base axle and a second end opposite said first end, said each adjustable mount block defining a channel between said first and second ends;
wherein said lower end of a respective gas spring being situated in said channel.

15. The mounting apparatus as in claim 14, wherein said each adjustable mount block includes:
a threaded fastener coupled to said lower end of a gas spring for slidably moving said lower end forwardly or rearwardly along said channel when actuated.

16. A mounting apparatus for positioning a television, the television having a VESA pattern of attachment, initially flush against a wall and then frontward of a fireplace mantel, said mounting apparatus comprising:
a wall housing inset into the wall and defining an open front and an interior area, said open front being flush with a front surface of the wall;
a positioning arm having a proximal end coupled to a base axle situated in said interior area and having a distal end opposite said proximal end and a body portion having a generally linear configuration extending between said proximal and distal ends,
said positioning arm being pivotally movable between a retracted configuration positioned completely inside said interior area and a deployed configuration extending at least partially outside of and extending away from said interior area;
at least a pair of gas springs each having an upper end coupled to a backplate inside said inset housing and a lower end operatively coupled to said base axle so as to be actuated when said positioning arm is actuated;
a mounting plate pivotally coupled to said distal end of said positioning arm and positioned inside said interior area at said retracted configuration and positioned outside said interior area at said deployed configuration.

17. The mounting apparatus as in claim 16, further comprising at least a pair of adjustable mount blocks each having a first end coupled to the base axle and a second end opposite said first end, said each adjustable mount block defining a channel between said first and second ends;
   wherein said lower end of a respective gas spring is situated in said channel.

18. The mounting apparatus as in claim 17, wherein each said adjustable mount block includes:
   a threaded fastener coupled to said lower end of a gas spring for slidably moving said lower end forwardly or rearwardly along said channel when actuated.

19. The mounting apparatus as in claim 16, wherein said mounting plate includes a rear portion opposite said front portion that is coupled to a swiveling assembly that is, in turn, coupled to said distal end of said positioning arm, said swiveling assembly having an upstanding fastener that defines a vertical axis about which said mounting plate is selectively swiveled between a left viewing configuration and a right viewing configuration.

20. The mounting apparatus as in claim 19, wherein said upstanding fastener is one of a bolt or a rod.

21. The mounting apparatus as in claim 19, wherein said swiveling assembly is slidably coupled to said distal end of said positioning arm and selectively movable between a retracted configuration at which said mounting plate is immediately adjacent said distal end of said positioning arm and a deployed configuration at which said mounting plate is displaced from said distal end of said positioning arm.

22. The mounting apparatus as in claim 16, further comprising a vertical adjustment bracket coupled to a front portion of said mounting plate for securing the television to said mounting plate, said vertical adjustment member being one of expandable or movable so to accommodate and attach to the VESA pattern of the television positioned outside said interior area at said deployed configuration.

23. The mounting apparatus as in claim 16, wherein an upper edge of said mounting plate defines a horizontal axis about which the mounting plate is selectively pivoted between a normally upstanding configuration and a tilted configuration in which a bottom edge of said mounting plate is extended outwardly and forwardly.

* * * * *